(12) United States Patent
Viard

(10) Patent No.: US 7,685,662 B2
(45) Date of Patent: Mar. 30, 2010

(54) PNEUMATIC CONTROL VALVE AND POWER RESERVE FOR A MATTRESS

(75) Inventor: Jean-Louis Viard, Grabels (FR)

(73) Assignee: Hill-Rom Industries SA, Montpellier (FR)

( * ) Notice: Subject to any disclaimer, the term of this patent is extended or adjusted under 35 U.S.C. 154(b) by 0 days.

(21) Appl. No.: 12/125,402

(22) Filed: May 22, 2008

(65) Prior Publication Data

US 2008/0289114 A1 Nov. 27, 2008

(30) Foreign Application Priority Data

May 25, 2007 (FR) .................................. 07 03742

(51) Int. Cl.
*A47C 27/08* (2006.01)
(52) U.S. Cl. .......................... 5/713; 5/715; 137/625.33; 251/61.1; 251/331
(58) Field of Classification Search ............. 5/706–715; 251/61.1, 331; 137/625.33, 863
See application file for complete search history.

(56) References Cited

U.S. PATENT DOCUMENTS

| 3,633,605 A | | 1/1972 | Smith | |
|---|---|---|---|---|
| 4,068,334 A | * | 1/1978 | Randall | ........................ 5/713 |
| 4,488,322 A | * | 12/1984 | Hunt et al. | ..................... 5/713 |
| 4,745,647 A | | 5/1988 | Goodwin | |
| 4,798,227 A | | 1/1989 | Goodwin | |
| 4,838,309 A | | 6/1989 | Goodwin | |
| 5,051,673 A | * | 9/1991 | Goodwin | ..................... 318/481 |
| 5,052,067 A | | 10/1991 | Thomas et al. | |
| 5,272,778 A | | 12/1993 | Gore | |
| 5,349,983 A | | 9/1994 | Ozarowski et al. | |
| 5,529,280 A | | 6/1996 | Satoh et al. | |
| 5,647,079 A | | 7/1997 | Hakamiun et al. | |
| 5,941,272 A | * | 8/1999 | Feldman | ..................... 137/223 |
| 6,202,672 B1 | | 3/2001 | Ellis et al. | |
| 6,302,145 B1 | | 10/2001 | Ellis et al. | |
| 6,415,814 B1 | | 7/2002 | Hand et al. | |
| 6,418,579 B2 | * | 7/2002 | Perez et al. | ..................... 5/713 |
| 6,439,264 B1 | | 8/2002 | Ellis et al. | |

(Continued)

FOREIGN PATENT DOCUMENTS

CH 686 051 A5 12/1995

(Continued)

OTHER PUBLICATIONS

Preliminary Search Report from FR 0703742, dated Feb. 7, 2008, 2 pages.

(Continued)

*Primary Examiner*—Peter M Cuomo
*Assistant Examiner*—Nicholas Polito
(74) *Attorney, Agent, or Firm*—Barnes & Thornburg LLP

(57) ABSTRACT

A pneumatic control valve and power reserve in the form of pressurized gas in a pressurization chamber, for elastically deforming a diaphragm without closing off two admission (2) and respectively discharge (3) orifices of said valve and able to place the opening of the valve by depressurization of said pressurization chamber 5 is disclosed. The valve may be used for total and rapid deflation of a therapeutic mattress having a plurality of compartments that are inflated with air, including at different pressures.

20 Claims, 6 Drawing Sheets

U.S. PATENT DOCUMENTS

| | | |
|---|---|---|
| 6,568,013 B2 | 5/2003 | Perez et al. |
| 6,574,813 B2 | 6/2003 | Bolden et al. |
| 6,668,408 B2 | 12/2003 | Ferrand et al. |
| 6,820,640 B2 | 11/2004 | Hand et al. |
| 6,941,598 B2 | 9/2005 | Ferrand et al. |
| 7,165,569 B2 * | 1/2007 | Berbuer .................. 137/87.01 |
| 7,290,564 B2 * | 11/2007 | Takahashi et al. ...... 137/625.25 |
| 7,475,440 B2 * | 1/2009 | Chaffee ......................... 5/644 |
| 2001/0023512 A1 | 9/2001 | Perez et al. |
| 2002/0023681 A1 | 2/2002 | Ellis et al. |
| 2005/0047923 A1 | 3/2005 | Li et al. |
| 2008/0201858 A1 * | 8/2008 | Caminade ..................... 5/713 |

FOREIGN PATENT DOCUMENTS

FR          1 375 258      10/1964

OTHER PUBLICATIONS

Opinion from FR 694055, dated May 25, 2007, 4 pages.

* cited by examiner

PNEUMATIC CONTROL VALVE AND POWER RESERVE FOR A MATTRESS

The present application claims priority, under 35 U.S.C. §119(a), of French National Application No. 07/03742 which was filed May 25, 2007 and which is hereby incorporated by reference herein.

BACKGROUND

The present disclosure relates to support devices, such as mattresses, having pneumatic control devices, such as air supply/discharge valves that are used to supply air or empty compartments inflated with air, and having a plurality of compartments to be inflated with fluid such as compressed air.

In some prior art mattresses, these compartments are in the form of cylinders, each cylinder extending transversally relative to the longitudinal direction of the mattress and the different cylinders being placed side by side in the longitudinal direction of the mattress. Each compartment of some prior art mattresses has a fluid supply orifice and a fluid discharge orifice.

To fill/inflate a compartment, a first valve, typically an electrovalve controlling the supply via said supply orifice, is opened, then air is injected under pressure, then this first electrovalve is closed when the necessary pressure is reached while a second electrovalve controlling the discharge of fluid from said discharge orifice is kept closed. And, inversely, for emptying or deflating a compartment, for adjusting the pressure inside the compartment, said first electrovalve controlling the supply orifice is kept closed and the second electrovalve controlling the discharge from the discharge orifice is opened.

Mattresses of this type are used in medical environments as they ensure better distribution of the fluid inside the mattress. And, as a function of the number of electrovalves employed, they individually control the pressure and therefore the filling of the compartments in different zones of the mattress.

SUMMARY

By way of illustration in FIG. 1, a mattress comprising sixteen compartments or cylinders distributed over three zones is schematically illustrated:

a first zone $Z_3$ from head to shoulders with a single compartment, a second zone $Z_2$ from shoulders to calves comprising twelve compartments, and a third zone $Z_1$ at the level of the heels comprising three compartments.

In principle, the ideal comfort of a patient, especially for preventing the formation of bedsores or reducing localized pain in certain support zones of the body on the mattress, is obtained when the pressure exerted by the different zones of the body on the mattress (called <<interface pressure>>) is substantially identical for all points of the contact surface of the body with the mattress and if, on the other hand, this contact surface of the body with the mattress is the highest possible, requiring the body sinking into different compartments to be adapted according to the different parts of the body.

To this end, the pressure inside the compartments may be distributed by controlling their filling/emptying in the different compartments along the longitudinal direction of the mattress according to certain predetermined calculations from, and as a function of, the measurements carried out with sensors in, on or under the mattress according to the type of sensors used.

These sensors, familiar to those skilled in the art, can measure the pressure inside the compartments or the sinking of the body of the patient into the given compartments of the mattress, such as described for example in European patent EP 0 676 158 in the name of the applicant.

The electrovalves disclosed herein are designed to be mounted in housings especially on pneumatic distributors, more generally on a collector/distributor multiple of combined manifold type, where desired, with an electronic control housing for controlling the modulated and controlled supply and discharge of fluid in the different compartment zones of the mattress. The different supply electrovalves are, in general, fed with fluid from the same supply source, where desired, the same pump or compressor for injecting air or compressed gas into the compartments, as desired.

These technical fluid control and distribution housings of manifold type housing the various electrovalves are placed for example at the foot of the bed are therefore, in such instances, relatively far from some of the compartments to which the electrovalves are connected by supply pipes and discharge pipes.

In some embodiments, each electrovalve is dedicated to the supply, and/or discharge of several compartments, respectively, so as to limit the number of electrovalves.

The limitation of the number of electrovalves also limits the number of pipes at the start of the manifold and therefore the bulk made by these pipes.

FIG. 1 illustrates a manifold comprising three supply electrovalves on which are mounted three main supply pipes from each of which derivations, by means of T-junctions of secondary supply pipes supply n compartments.

Symmetrically, n secondary discharge pipes connected to the discharge orifices of said compartments are connected by means of the T-junction to three main discharge pipes, with discharge ensuring circulation of the fluid to three discharge valves on the same manifold.

More precisely in FIG. 1 the valves $V_3$ and $V_6$ control a single compartment of a first head zone by means of a first main supply pipe and, respectively, a first discharge pipe.

The valves $V_2$ and $V_5$ control the supply and, respectively, discharge of twelve compartments of a median zone extending over the whole body from the shoulders to the legs, the twelve compartments being supplied by twelve second secondary supply pipes and, respectively, discharge pipes, in turn attached to a second main supply pipe and a second main discharge pipe connected to said corresponding valves.

Finally, the valves $V_1$ and $V_4$ control the filling of three compartments making up a foot zone from a third main supply pipe and third main discharge pipe, each third main supply pipe and respectively discharge pipe being attached to three third secondary supply pipes and, respectively, three secondary discharge pipes.

It can happen that there is an urgent need to completely empty out the air contained in all the compartments of a therapeutic mattress to rest a patient in cardiac distress on a hard plane to give cardiac massage and/or intubate the patient.

In this case, the usual electro discharge valves of the type of valves $V_4$ to $V_6$ of FIG. 1 may not be appropriate as they are sized for relatively low rates. In fact, due to the fact that these electrovalves are often stressed to regulate inflation of the mattress, the attempt is made to reduce their sound nuisance and power consumption by reducing their volume capacity to maximum. These usual electro-discharge valves are therefore inappropriate for carrying out complete urgent, therefore rapid, emptying of all the compartments of a mattress simultaneously.

Specific valves known as "CPR" are used for carrying out this type of operation known as "CPR" ("Cardio Pulmonary Resuscitation").

These valves known as "CPR" may evacuate air at low pressure and at a high rate.

Two types of CPR valves are currently used:
control valves, requiring manual intervention directly on the valve, and
remote control valves by electric activation of the valve.

The manual control valves of CPR type are sometimes not easy to handle and can be difficult to access due to, for example, being encumbered by sheets, covers and safety barriers on the bed, resulting in significant time loss during handling.

With electric activation remote control valves, a problem may arise when there is an electric outage in the chamber and when the mattress needs to be deflated for urgent cardiac massage and/or when the patient is shifted on his/her bed between the bedroom and an operating theatre or radiology department. Here again, the mattress is to be deflated in the absence of a power supply. In this latter case, an additional autonomous power source may be supplied, in case of accidental current cut-off or during transfer of the mattress. The power source is generally ensured by a rechargeable battery which must be in a charged state, and this permanently requires an adequate charger.

This widely employed prior art technique is onerous, and the equipment is also heavy and involves significant heat supply.

Another disadvantage is that it may be necessary to use as many valves of the CPR type as there are compartment zones at different pressures in the therapeutic mattress in question.

Disclosed herein is a novel type of valve, useful more particularly as a valve for rapid and total emptying of a therapeutic mattress with inflated air compartments, especially a valve of the so-called CPR type, which is easy, economical and reliable to operate.

The disclosed valve is operable to empty air from all the compartments of the same therapeutic mattress, even those inflated at different pressures.

Another aspect of the disclosed valve is that it provides a valve of the CPR type which does not require electric supply to be kept in a so-called open state or in a so-called closed state.

According to this disclosure, a valve of the CPR type can be triggered remotely and without external power supply, especially without electric power supply, change state between the closed state and the open state.

Further according to this disclosure, a valve of the CPR type does not require an electric supply to control a change of state between a closed state preventing the circulation of air across the valve and an open state allowing circulation of air across the valve.

To this end, this disclosure provides detail of a pneumatic control valve with a power reserve, with at least one gas admission orifice and at least one gas discharge orifice connecting to the atmosphere, with the pneumatic control controlling:
either a closed state of said valve preventing the circulation of gas between said admission orifice and discharge orifice,
or an open state of said valve allowing circulation of gas via and between said admission orifice and discharge orifice in an open position,
said pneumatic control of change of state occurring by shifting a diaphragm, said diaphragm establishing close separation between, on the one hand, said admission orifice and discharge orifice and, on the other hand, a first chamber known as a pressurization chamber, and
said diaphragm being suitable for deforming elastically between the following two positions of said opening and closing controlling states of opening and respectively of closing of said valve:
a closed position in which said pressurization chamber is pressurized by injection of gas, preferably air, the diaphragm being deformed elastically so as to close off said admission orifice and discharge orifice, and
an open position, in which said pressurization chamber is depressurized, said diaphragm returning to its rest position in which the diaphragm separates said first chamber and a second chamber known as a circulation chamber allowing circulation of gas via and between said admission orifice and discharge orifice inside said valve,
characterized in that said pressurization chamber comprises:
a pressurizing orifice cooperating with first closing/opening means of said pressurizing orifice and a compressor for injecting gas, preferably air, under pressure into said pressurizing orifice (6), and
a depressurization orifice by placing said first chamber at atmospheric pressure, cooperating with second closing/opening means of said depressurization orifice,
the diaphragm being suitable for:
remaining in a said closed position of said valve, without injection of gas in said pressurizing orifice, when said pressurization chamber is under pressure greater than said circulation chamber and when said first and second closing/opening means of said orifices remain in a closed position, and
moving from a said closed position to a said open position of said valve and remaining in a said open position of said valve when said second closing/opening means of said depressurization orifice is open, and
moving from a said open position to a said closed position of said valve by closing of said second closing/opening means of the depressurization orifice and opening of said first closing/opening means of said pressurization orifice, then injection of gas into said pressurization orifice until said pressurization chamber is under pressure greater than the pressure of said circulation chamber.

It is understood that:
moving from said open position to said closed position can occur by injection of gas, without power supply other than that required for optionally opening said first closing/opening means of the pressurization orifice and for closing said second closing/opening means of the depressurization orifice, and
pressuring said pressurization chamber, followed by placing the valve into said closed state, constitutes a pneumatic energy reserve sufficient to keep the diaphragm in a closed position without external power supply, especially without electric power supply, and
moving from a said closed position to a said open position can be done by releasing this power reserve by placing said depressurization orifice at atmospheric pressure, without external power supply other than that necessary optionally for opening said second closing/opening means of the depressurization orifice, given that gas arriving at the level of said admission orifice is under pressure greater than or equal to atmospheric pressure.

Similarly, depressurization of the pressurization chamber, especially by opening the latter and placing it at atmospheric pressure, remains in said open state without power supply other than that necessary prior to this depressurization, especially for opening a said orifice of the pressurization chamber, and when the diaphragm is in a said closed position of said admission orifice and discharge orifice, said pressurization chamber extends to encompass the volume of said second circulation chamber, which no longer exists or disappears when the diaphragm is in a said closed position.

When a valve according to this disclosure is utilized by way of a CPR valve, it is possible to connect the possible different admission orifices of the valve to discharge orifices of compartments of the mattress inflated with air at different pressures, each admission orifice of the valve able to be connected to all the compartments inflated at the same pressure. Thus, it is possible to use a single CPR valve for a mattress comprising several compartment zones inflated at different pressures, on condition that the number of these admission orifices of the valve is at least equal to the number of compartment zones inflated at different pressures.

It is understood that said pressurization chamber comprises at least one orifice cooperating with means of injecting compressed air and closing/opening means of said pressurization chamber allowing filling of gas, especially air, into said chamber and maintenance of pressurization after filling air or emptying of said pressurization chamber by opening and placing a said orifice of said pressurization chamber at atmospheric pressure.

However, said first closing/opening means of said pressurizing orifice is, in some embodiments, an automatic non-return valve, functioning without external power supply other than the pressure of the gas injected into said pressurization orifice, and/or a mechanical non-return valve, comprising elastic means such as a spring, said non-return valve having said elastic means being suitable for:

keeping in an open position said first closing/opening means of said pressurizing orifice while the pressurization chamber is at a pressure less than or equal to the pressure of said circulation chamber, and keeping in a closed position said first closing/opening means of said pressurizing orifice while no compressed air is injected at pressure greater than the pressure of the air in said pressurization chamber.

In practical terms, air is sent by a mini compressor or by the main compressor of the mattress at a pressure 5 to 10 times greater than the maximum pressure allowed in the compartments of said mattress to which said admission orifices of said valve are attached, where required, or around 100 to 500 mbar, corresponding to the maximum pressure possible, in some embodiments, of said circulation chamber.

In some embodiments, said second closing/opening means of said depressurization orifice is a manual mechanical drain cock with control, cooperating with said depressurization orifice, such as at the end of a pipe providing a bond between said drain cock and said depressurization orifice.

This drain cock, attached to the valve by a pipe possibly reaching several meters, can thus be positioned far from said valve, at a more accessible point for medical personnel.

When said first closing/opening means of said pressurizing orifice is a mechanical non-return valve such as described hereinabove and when said second closing/opening means of said depressurization orifice is a mechanical manual drain cock with control, such as described hereinabove, the pressurization chamber can remain under pressure and said valve according to this disclosure in said closed state, even though the compressor for injection of air into said pressurization chamber is to stop.

Said first closing/opening means and second closing/opening means can be kept in a closed position and without external power supply. And, to keep a valve in said open state, it suffices to actuate said mechanical manual drain cock with control, manually allowing said pressurization chamber to be put in communication with the external air and atmospheric pressure.

In some embodiments, the pneumatic control valve with power reserve according to this disclosure comprises:

a first body, called control body, and a second body, called circulation body, said diaphragm being inserted and blocked at its periphery between the two first and second bodies, said first body comprising a hollow form delimiting part of the wall of said depressurization chamber, said first body being perforated by said pressurizing orifice and depressurization orifice, and said second circulation body having a surface of concave form turned towards the diaphragm inside the valve and said second body being perforated by said admission orifice and discharge orifice.

It is understood that:

said pressurizing orifice and depressurization orifice terminate in said pressurization chamber on one side, and outside the valve on the other side, and said admission orifice and discharge orifice of said second body terminate on said concave surface in one side and towards the outside on the other side.

The depth of the concave surface is determined so that sufficient passage is possible in said circulation chamber between said diaphragm in a rest position and said admission and discharge orifices.

More particularly, if the two bodies forming the valve are circular in section, the diaphragm may be a washer.

In some instances, when said diaphragm is in an open position, the surface of the minimal passage section between said admission orifice and discharge orifice inside said circulation chamber is at least equal to the total surface of the sections of said admission orifices, the latter itself being less than or equal to the total surface of the sections of said discharge orifices.

This disallows any restriction to throttle the discharge of air.

In some embodiments, the different admission and discharge orifices are separated from one another by the full surface (i.e. non void surface) of said concave surface and the distance between two orifices closest to one another is at least equal to half the diameter of the largest admission and/or discharge orifice.

This characteristic aims to offer an adequate support surface for proper adherence of the diaphragm in a closed position.

In some embodiments, said admission orifice and discharge orifice are cylindrical orifices terminating on said concave surface preferably forming a partial spherical cap surface and said admission orifice and discharge orifice of the valve are placed in a crown and alternately, symmetrically relative to the axis of symmetry of said concave surface.

The diaphragm may be constituted by low-resistance plastic so that it returns to its initial geometry when the pressurization chamber returns to atmospheric pressure even after a lengthy period of deformation.

The deformation properties of the diaphragm can be improved by pre-forming it such that its deformation course is reduced while maintaining sufficient air passage. It can also be envisaged to groove the diaphragm so that it returns more easily to its rest position while having adequate deformation.

In some embodiments, the diaphragm is made from an elastic plastic material, such as rubber, of a thickness less than or equal to 2 millimeters.

According to this disclosure, a valve comprises a plurality, such as at least three admission orifices, and a plurality, such as three discharge orifices.

This configuration produces optimal air flow while preserving an optimal contact surface of the diaphragm against said second body to ensure perfect tightness between the pressurization chamber and the circulation chamber. More or less orifices may be provided in other embodiments.

This type of pneumatic control valve comprising a plurality of admission orifices and a plurality of discharge orifices is particularly useful for making a total and rapid deflation valve known as <<CPR >>, as will be explained hereinbelow.

In another embodiment, a pneumatic control valve according to this disclosure comprises:
a single admission orifice, and
a single discharge orifice.

This type of valve is more particularly useful for providing an air supply valve in said compartments and/or air discharge valves of said compartments inflated with air, as will be explained hereinbelow.

In this latter type of application, a valve according to this disclosure is characterized in that:
said first closing/opening means of said pressurizing orifice are a non-return valve functioning mechanically without power supply such as defined according to this disclosure or a mini electrovalve cooperating with said pressurizing orifice, and
said second closing/opening means of said depressurization orifice are a mini electrovalve cooperating with said depressurization orifice.

Here, "electrovalve" means a valve functioning with electric power supply allowing the control of the closed and open states of said valve and the maintaining of said closed and open states of said valve.

As mentioned previously, this disclosure provides a support device, in particular for the body of an individual, of the mattress type, comprising a plurality of n compartments, such as at least three compartments, and in various instances, three to twenty-four compartments, suitable to be inflated with a fluid, in particular gas, more particularly still inflated with air, said compartments each comprising at least one supply orifice, and one fluid discharge orifice, and, at least one supply valve for controlling fluid supply of said compartments, and at least one discharge valve for discharging fluid from said compartments, each supply valve cooperating with at least one compartment supply orifice and, each discharge valve cooperating with at least one compartment discharge orifice, characterised in that it comprises at least one pneumatic control valve and power reserve according to this disclosure such as mentioned hereinabove.

In a first embodiment, the support device comprises at least one valve according to this disclosure comprising a plurality of admission orifices and a plurality of discharge orifices by way of total and rapid deflation valve known as CPR, whereof:
each admission orifice is connected to discharge orifices of said compartments of the same zone in which the different compartments are inflated at the same pressure, the different admission orifices being connected to compartment discharge orifices or discharge pipes respectively of different zones in which the supply and discharge of gas from the compartments is controlled by different supply valves and discharge valves, and
each discharge orifice of said pneumatic control valve communicates with the external air when said pneumatic control valve is in the open state.

It may be the case that the diameters of the admission orifices and discharge orifices of said pneumatic valve are substantially identical to the internal diameter of the standard linking pipes providing a bond between said admission orifices and discharge orifices of the valve and the fluid supply and discharge pipes cooperating with the admission and discharge orifices of said compartments.

In some embodiments, said admission orifices of said pneumatic control valve and power reserve are connected to discharge pipes between said compartment discharge orifices and said discharge valves, the latter possibly being electrovalves inserted into a distribution block.

In other embodiments, a support device according to this disclosure comprises at least one pneumatic control valve according to this disclosure comprising a single admission orifice and a single discharge orifice comprising:
a valve providing a supply valve of at least one compartment, whereof said admission orifice of the said valve is connected to a main compressor for injection of compressed air, and whereof said discharge orifice is connected to at least a compartment supply orifice or a supply pipe cooperating with at least one supply orifice of at least one compartment, and/or
a valve providing an air discharge valve of said compartments, whereof said admission orifice of said pneumatic valve is connected by means of a pipe to at least one discharge orifice of at least one compartment, said discharge orifice of said pneumatic control valve communicating with the external air.

In such embodiments, said discharge valves can be remote controlled to ensure rapid and total deflation of said mattress, in the same way as the valves known as CPR.

The present disclosure also contemplates a process for using a support device according to this disclosure, characterized in that:
to obtain a said closed position of said valve, compressed air is sent into a said pressurization chamber by said pressurizing orifice, whereof said first closing/opening means are in an open position, said second closing/opening means of said depressurization orifice being in a closed position, until the pressure of the pressurization chamber is greater than the pressure of the circulation chamber, so as to deform said diaphragm to close off said admission orifice and discharge orifice, and
to obtain a said open position of said valve said pressurization chamber is emptied by opening said second closing/opening means of said depressurization orifice, such that said diaphragm returns to its rest position in which the diaphragm separates said first pressurization chamber and said second circulation chamber allowing circulation of gas between said admission orifice and discharge orifice.

In some instances, a process for use, according to this disclosure, of a support device of mattress type in which said pneumatic control valve provides a total and rapid deflation valve of CPR type, such as defined hereinabove, characterized in that:
to obtain a said closed position of the said pneumatic control valve and power reserve of CPR type compressed air is sent to a said pressurization chamber until the pressure in said pressurization chamber is greater than the maximum pressure in said compartments, preferably from 100 to 500 mbar, and
to obtain complete and rapid deflation of all said compartments of said mattress said pneumatic control valve and power reserve of CPR type are placed in a said open position.

Using a valve with power reserve according to this disclosure, as a CPR valve, is particularly interesting as CPR valves are sometimes used in certain conditions, especially while the patient in bed is being shifted on a therapeutic mattress with inflated cells out of his room, that is, without any possibility of air supply and/or electric power supply. The CPR valve according to the present disclosure can be used urgently without external power supply and without the need to provide a power supply source of the CPR valve embedded in the mattress, which is particularly useful for this type of valve, in particular when the patient in bed on said mattress is shifted from one room to another.

BRIEF DESCRIPTION OF THE DRAWINGS

Other characteristics and advantages of the present subject matter will emerge more clearly from the following detailed description, given in reference to FIGS. 1 to 8, in which.

DETAILED DESCRIPTION

Figure 1:
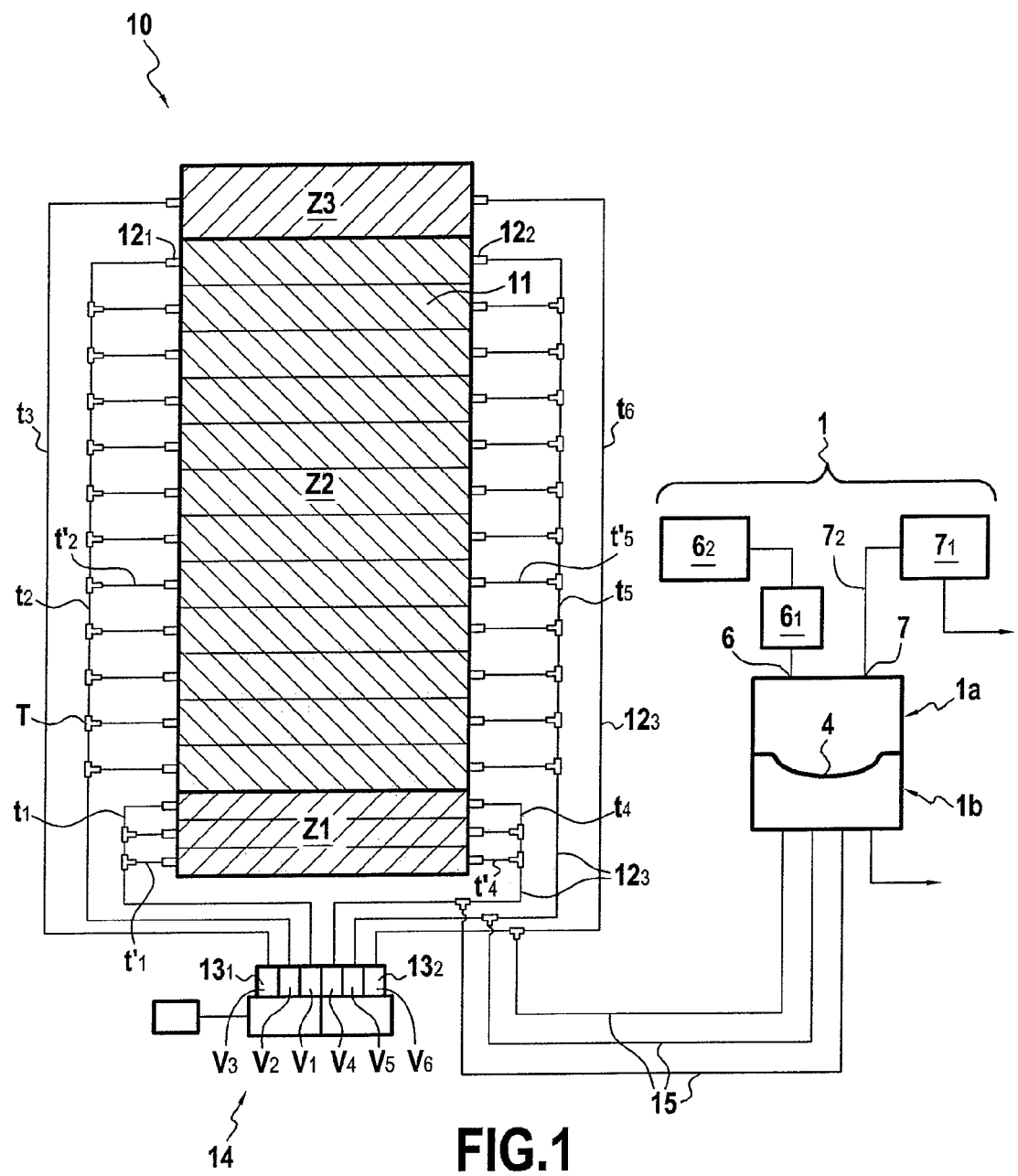
FIG. 1 illustrates a schematic view of a therapeutic mattress according to this disclosure, cooperating with a valve of "CPR" type according to this disclosure.

FIG. 1 schematically illustrates a mattress 10 comprising sixteen compartments constituted by cylinders 11 placed transversally to the longitudinal direction of the mattress.

These sixteen compartments are distributed over three zones, as follows:
head zone $Z_3$: one compartment,
body zone $Z_2$: twelve compartments, and
foot zones $Z_1$: three compartments.

FIG. 1 illustrates an air supply/discharge system of the different compartments from a collector comprising a supply manifold $M_1$ comprising three supply electrovalves $13_1$ $V_1$, $V_2$, $V_3$ and a discharge manifold $M_2$ comprising three electrodischarge valves $13_2$ $V_4$, $V_5$ and $V_6$.

This collector is combined with an electronic logic control, not shown here. The supply manifold $M_1$ is connected to a single pump/compressor $C_1$.

Each supply valve $V_1$ to $V_3$ is connected to a main supply pipe $t_1$ to $t_3$ feeding a compartment zone $Z_1$ to $Z_3$.

Symmetrically, each discharge valve $V_4$ to $V_6$ is connected to a main discharge pipe $t_4$ to $t_6$.

More precisely, from the main supply pipe $t_1$ the electrovalve $V_1$ supplies the three compartments of the foot zones, the pipe $t_1$ comprising two T attachments, from each of which a secondary derivation pipe $t'_1$ ensures connection via a tubular connection adapter to a tubular supply orifice $12_1$ of each compartment.

Symmetrically, from tubular discharge orifices $12_2$ of said compartments, placed on the side oppose the mattress are connected by tubular adapters of "splined" type, of the secondary discharge pipes $t'_4$, themselves connected by T connectors to the same main discharge pipe $t_4$ connected to the electro-discharge valve $V_4$ of the discharge manifold $M_2$.

The electrovalves $V_2$ and $V_5$ ensure control of supply and, respectively discharge of the twelve compartments of the zone of the body, by means of a main supply pipe $t_2$ and a main discharge pipe $t_5$ connected to the supply electrovalves $V_2$ and, respectively, to the electro-discharge valves $V_5$ of the collector.

The supply orifices $12_1$ of the twelve compartments of the zone $Z_2$ of the body are connected to the main supply pipe $t_2$ by means of secondary supply pipes $t'_2$, attached by T connectors to the pipe $t_2$ and tubular adapters, not shown here, to the tubular supply orifices $12_1$.

Symmetrically, secondary discharge pipes $t'_5$ ensure connection between the tubular discharge orifices $12_2$ to which they are connected by tubular adapters, not shown here, at one end and, at the other end, to the main discharge pipe $t_5$ by way of the T connector.

Finally, the supply electrovalves $V_3$ and electro-discharge valves $V_6$ ensure control of supply, respectively discharge of the single compartment of the head zone by means of a main supply pipe $t_3$ and a main discharge pipe $t_6$ to which they are respectively connected.

This pneumatic link network between the manifolds and the different compartments of the mattress in FIG. 1 functions in said mode at continuous pressures as all the compartments of each zone are fed and/or discharged identically, the only modulation possible being between the different zones from the three electrovalves/electro-discharge valves supply couples.

FIG. 1 illustrates a rapid deflation valve of CPR type with pneumatic control according to one embodiment.

Figure 2:
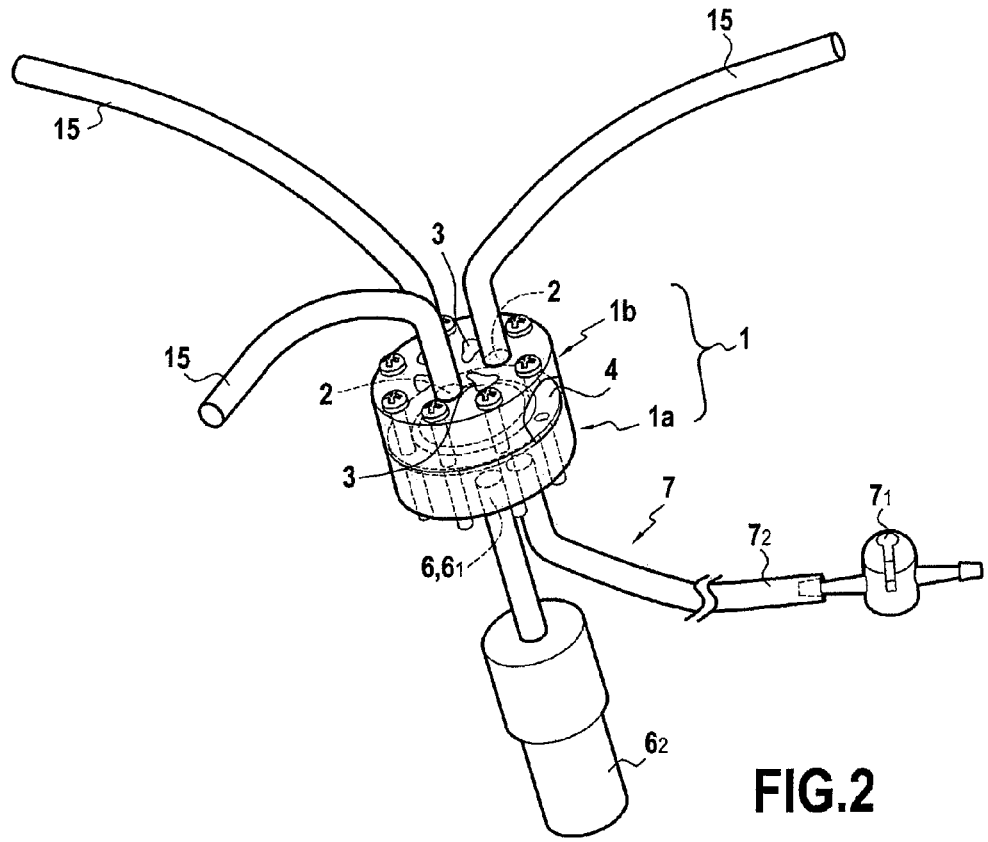
FIG. 2 is a view of a pneumatic control valve according to this disclosure.
Figure 3A:
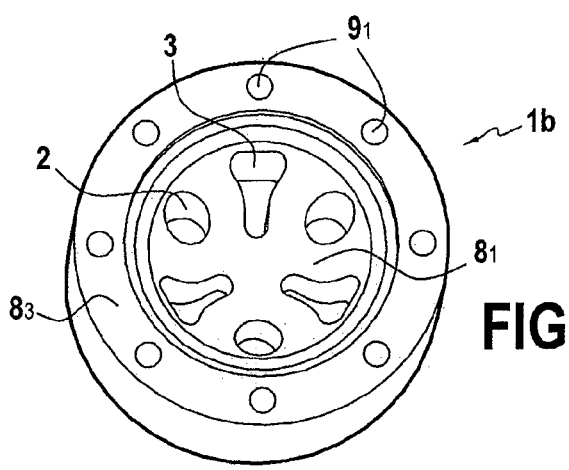
FIG. 3A is a view in perspective of said second body or circulation body of a valve according to this disclosure (perspective view, FIG. 3A and side elevation, FIG. 3B or view in section AA of FIG. 3B on FIG. 3C)
Figure 3B:
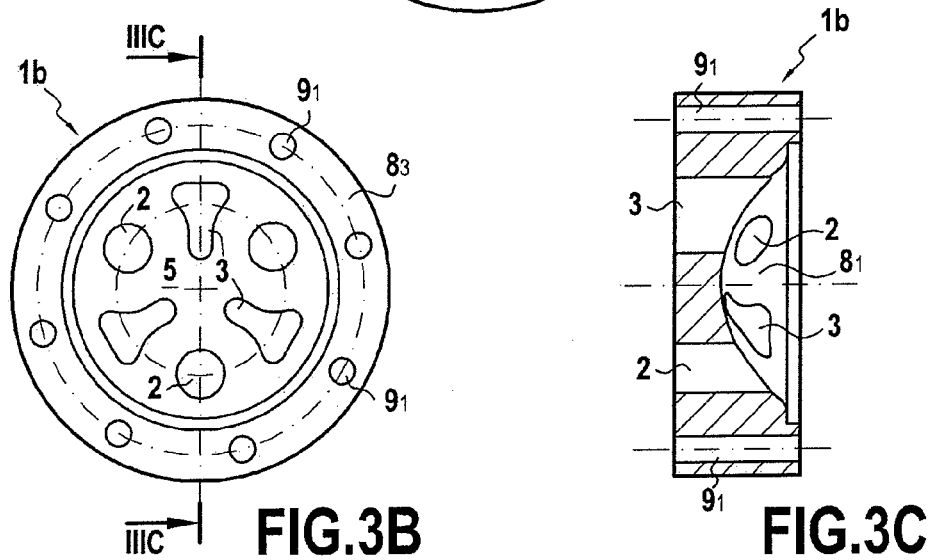
Figure 3C:
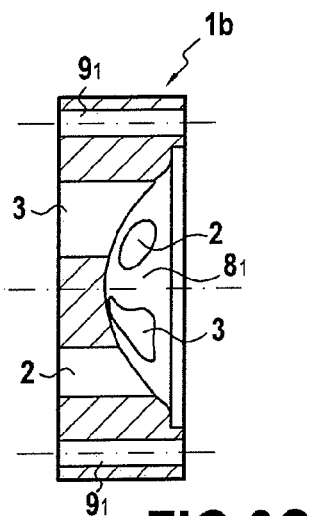

FIGS. 2 to 3 illustrate a pneumatic control valve and power reserve, comprising three admission orifices and three discharge orifices, each of said admission orifices 2 being connected to a pipe 15 originating from the discharge pipes $t_4$, $t_5$ and $t_6$ of the three zones $Z_1$, $Z_2$ and respectively $Z_3$ comprising compartments 11 at different pressures.

Said admission orifices 2 of the valve have a diameter substantially identical to the diameter of the standard discharge tubes 15 and $t_4$, $t_5$ and $t_6$.

Figure 5:
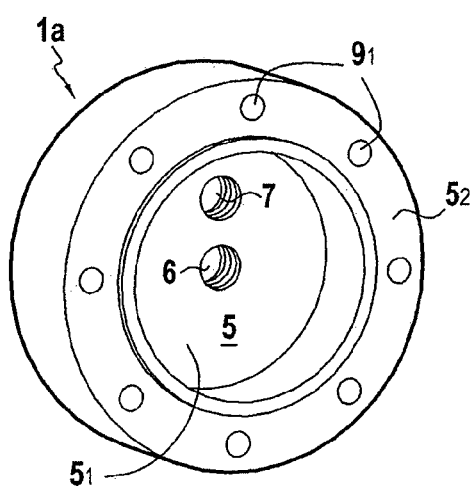
FIG. 5 is a view in perspective of said first control body with cylindrical section of a valve according to this disclosure.

A pneumatic control valve, according to this disclosure, comprises a first body 1a, known as control body, such as shown in FIG. 5, defining a hollow cylindrical chamber 5 or said pressurization chamber 5 comprising a full base $5_1$ in which the following two orifices are housed:
a pressurizing orifice 6,
a depressurization orifice 7.

The pressurizing orifice 6 cooperates with a non-return valve $6_1$, itself inserted in between said pressurizing orifice 6 and a mini compressor $6_2$.

Said depressurization orifice 7 cooperates with a pipe 2 at the other end of which is mounted a drain cock $7_1$ which, by mechanical opening, depressurizes the pressurization chamber, where desired.

This drain cock $7_1$ attached to the valve 1 by a tube $7_2$ can reach several meters in length, and can thus be positioned at the most accessible place for medical personnel for emptying air from the compartments of the different zones of the mattress by opening of said drain cock, as will be explained hereinbelow.

Figures 2A, 2B:
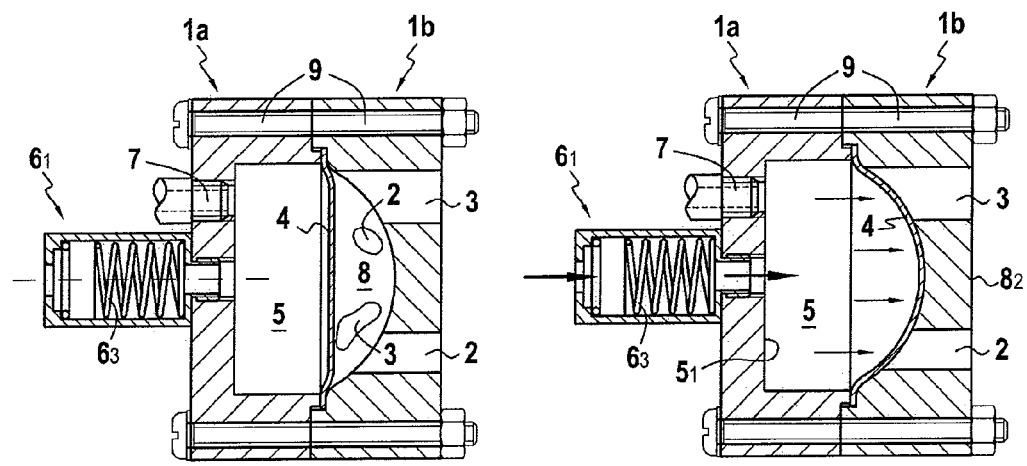
FIGS. 2A and 2B are schematic views in section of a valve according to this disclosure, in said open state (FIG. 2A) and said closed state (FIG. 2B)

FIG. 2B illustrates a variant in which the closing/opening means of the depressurization orifice 7 is constituted by a mini electrovalve (not shown), which can be remote controlled by electric activation as known to those skilled in the art.

Said first guide body 1a, delimiting said pressurization chamber 5, comprises an open face whereof the edge of the cylindrical peripheral wall $5_2$ cooperates with the peripheral edge of the diaphragm 4 in the form of a washer, made of elastic plastic material of rubber type from 1 to 2 mm thick with low resistance.

A diaphragm made of elastic material in the form of a rubber washer 4 is inserted in between said first guide body 1a and a second circulation body 1b of circular section. Said second body 1b is adapted to be fixed against said first body 1a by means of screws 9 cooperating in peripheral cylindrical perforations $9_1$, which coincide in each of said first and second bodies 1a and 1b.

These two first and second bodies 1a and 1b have surfaces $5_2$ and $8_3$ that contact one another, and are shaped so as to press the edges of the diaphragm 4 against the peripheral surface $5_2$ and $8_3$, of each of said first and second bodies, to ensure sufficient tightness.

The crushing of the periphery of the diaphragm between the first and the second bodies is ensured by the screw 9 passing through the cylindrical perforations $9_1$ distributed so as to spread the effort without twisting said body and the diaphragm.

When the diaphragm 4 is in a rest position, that is not deformed, wedged in between the two first bodies 1a and second bodies 1b, it separates a so-called pressurization chamber 5 inside said first body 1a and a said circulation chamber 8 inside said second body 1b.

The surface $8_1$ of said second body 1b turned to the side of the first body 1a has a concave form in the form of a spherical cap defining the circulation chamber 8 between said concave surface $8_1$ and said diaphragm 4.

The concave surface $8_1$ of the second circulation body 1b comprises three said admission orifices 2 of circular section and three said discharge orifices 3 placed alternatively and in a crown relative to the admission orifices 2.

The full surface of said concave surface $8_1$ represents more than 50% of the perforated surfaces corresponding to said admission orifice 2 and discharge orifice 3.

The admission orifices 2 have a diameter of 4 to 8 mm and the distance between an admission orifice and each of the adjacent discharge orifices is greater than the diameter of said admission orifice.

On the other hand, the surface of the transversal section of the cylindrical discharge orifices 3 is greater than the circular section of the cylindrical admission orifices 2.

Figure 2C:
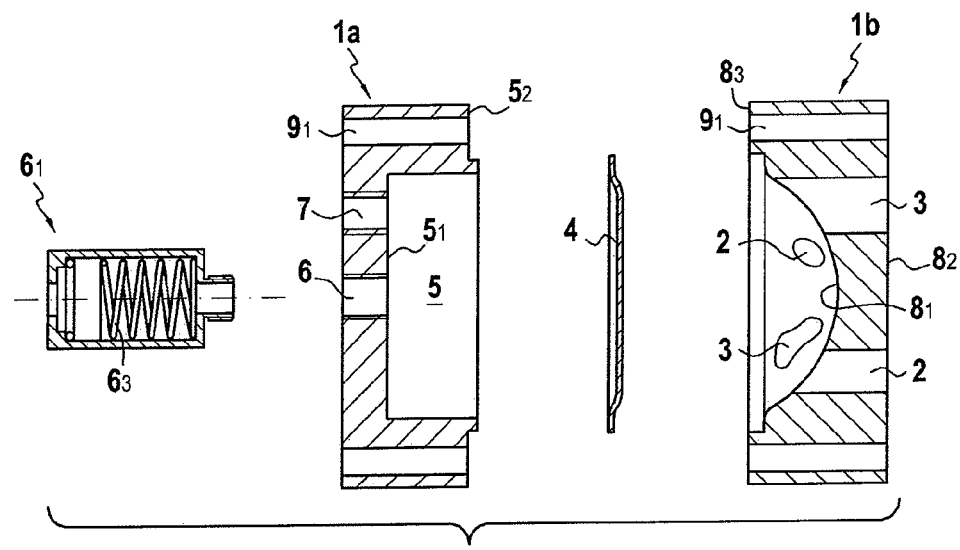
FIG. 2C is an exploded view of the different pieces making up a valve according to this disclosure.

As shown in FIG. 2B, the hemispherical form of the internal concave surface $8_1$ (FIG. 2C) of said second body 1b allows the diaphragm 4, when deformed by being pressurised by the pressurization chamber 5, to be held on the entire said concave surface $8_1$ and, thus, at the same time blocks off said admission orifices 2 and discharge orifices 3 of the valve.

The discharge orifices 3 have a non-circular section as they terminate directly in open air on the face $8_2$ of said second circulation body 1b opposite the face $8_1$ having a hemispherical concave face delimiting said circulation chamber 8.

The form of the hemispherical concave surface $8_1$ of said second body 1b, the size, the form and the distribution of said admission 2 and discharge 3 orifices produce sufficient air flow, by maintaining a contact surface of the diaphragm 4 on the concave surface of the body 1b ensuring sufficient tightness of the pressurization chamber 5 by substantially totally blocking off said admission orifice 2 and discharge orifice 3.

The depth of said hemispherical concave surface corresponds substantially to $\frac{1}{6}^{th}$ of the diameter of the diaphragm 4, such that, when said diaphragm is in a rest position such as shown in FIG. 2A, the passage section at any point inside the circulation chamber 8 is greater than the full surface of the sections of the admission orifices 2, the latter also being less than or equal to the full surface of the sections of the discharge orifices 3.

The dimensions of the body 1b are determined by the number and diameters of the admission orifices 2 and discharge orifices 3 of the valve.

Figure 4A:
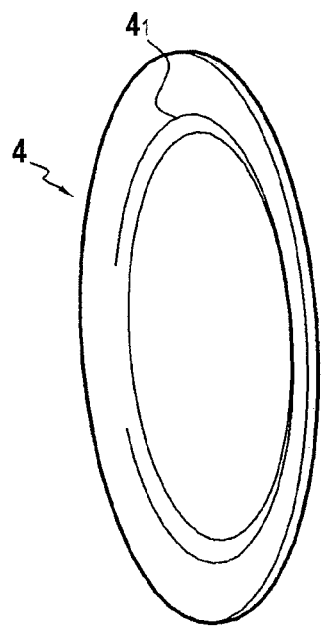
FIGS. 4A and 4B are views of a diaphragm of a valve according to this disclosure (at rest (FIG. 4A) and deformed (FIG. 4B))
Figure 4B:
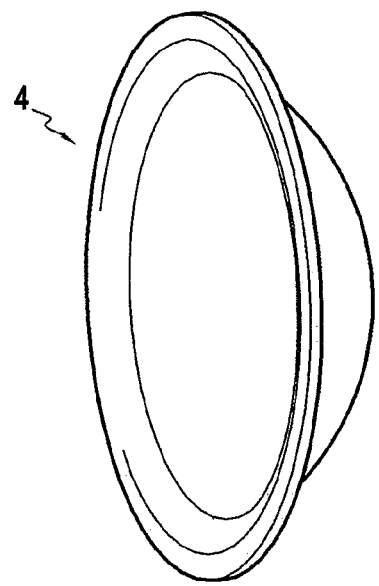

In FIGS. 4A and 4B, the diaphragm comprises a peripheral groove $4_1$ which facilitates the return in a rest position of the washer (FIG. 4A) after deformation according to FIG. 4B.

Figure 6:
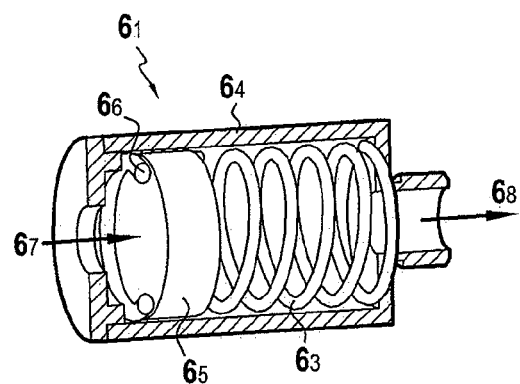
FIG. 6 is a view in longitudinal schematic section of a non-return valve of a valve according to this disclosure.

FIG. 6 illustrates an embodiment of a non-return valve $6_1$ adaptable to the pressurizing orifice 6 of said first body 1a, by way of opening/closing means of said orifice. This non-return valve functions automatically and without power supply. It comprises a spring $6_3$ which:

maintains said pressurizing orifice in an open position, given that the pressurization chamber is at a pressure lower than the pressure of said circulation chamber and less than or equal to the pressure of said circulation chamber 8, and maintains said pressurizing orifice 6 in a closed position, given that the no compressed air is injected at a pressure greater than the pressure of the air into the so-called pressurization chamber 5.

This non-return valve $6_1$ has a hollow cylindrical body $6_4$ comprising a piston $6_5$, held against an O-ring $6_6$ by the expansion action of a spring $6_3$ ensuring closing of the valve and therefore of the orifice 6.

This hollow cylindrical body $6_4$ has longitudinal grooves on its internal surface, for letting through air exiting from the piston $6_5$ when the latter is no longer being pushed by the spring $6_3$ against the O-ring $6_6$.

The air $6_7$ coming from a mini compressor $6_2$ (not shown in FIG. 6) pushes the piston $6_5$, which compresses the spring $6_3$ and disengages the piston $6_5$ from the O-ring $6_6$, thus allowing passage for air through said body $6_4$ along the longitudinal grooves on the internal surface of the body $6_4$ (not shown) to exit at $6_8$ inside said pressurizing orifice 6 in the direction of the pressurization chamber 5.

In practical terms, the air coming from the mini compressor $6_2$ is sent at a pressure of 100 to 500 mbar, for example, so as to thrust the piston $6_5$ and pass through the cylindrical hollow body $6_4$ to exit at said pressurization chamber 5 so as to push the diaphragm 4.

When a given pressure of 100 to 500 mbar is reached inside the pressurization chamber 5, said diaphragm 4 is held against the hemispherical concave surface, thus closing off said admission orifices 2 and discharge orifices 3. The mini compressor $6_2$ is then stopped and the piston $6_5$ returns to its initial position by the effect of the spring $6_3$ and the pressure inside the pressurization chamber 5, thus ensuring closing of the valve $6_1$ and therefore the tightness of said pressurization chamber 5. This non-return valve thus maintains the pressure inside the pressurization chamber 5 to the extent where the drain cock $7_1$ is in a closed position.

When the pneumatic control valve 1, according to this embodiment, is in the closed state such as shown in FIG. 2B, the different admission orifices 2 connected by pipes 15 to the different discharge pipes $t_4$, $t_5$, $t_6$ ensuring discharge from the compartments 11 of the different zones $Z_1$, $Z_2$, $Z_3$, respectively from their discharge orifices $12_2$, are closed off and the valve 1, according to this embodiment, providing a "CPR" valve that prevents emptying of the air contained in the different compartments 11.

It is typical to provide a plurality of admission orifices, one for each zone of cylinders at given pressure, and not a single admission orifice, to prevent the different zones communicating with one another at the level of T link, which would prevent keeping the different zones at different pressures.

To activate substantially total and rapid deflation of air from the different compartments 11, the tap with mechanical opening $7_1$ is opened manually providing closing/opening means of said depressurization orifice 7, the result of which is to place the pressurization chamber 5 at atmospheric pressure, such that the diaphragm 4 which, on its face opposite the side of the circulation chamber 8, is subjected to pressure corresponding to the internal inflation pressure of the compartments 11 communicating with the different admission orifices 2, is deformed until it returns to a so-called straight rest position, such as shown in FIG. 2A.

Accordingly, the air contained in the compartments 11 can circulate from said admission orifices 2 which are kept open, then, pass inside said circulation chamber 8 and leave via said discharge orifices 3 terminating in open air.

The "CPR" valve, according to this disclosure, therefore allows a high rate of discharge of air contained in the cylinders 11 and said "open state" triggering of the valve in which the diaphragm is disengaged from said admission orifices 2 and discharge orifice 3 to adopt the rest position in FIG. 2A, is triggered without any electric power supply, only by the power reserve which it encloses in the form of pneumatics.

It is this pneumatic power reserve which allows the diaphragm to be kept in a said closed position without any power supply, especially electricity.

In practical terms, the diaphragm has a diameter of 30 millimeters and moves according to its axis XX over a distance of displacement from 4 to 5 millimeters.

A sufficiently large pressurization chamber volume 5 is provided to absorb any possible small leaks at the level of the contact of diaphragm/first guide body 1a and second circulation body 1b.

In practical terms, the volume of the pressurization chamber 5 will be at least 5 cm³, preferably at least 10 cm³, more preferably at least 50 cm³, or at least twice the volume between the diaphragms at rest and the internal concave hemispherical surface of said body 1b delimiting the circulation chamber 8, preferably at least four times, preferably again at least 10 times.

The diaphragm is made of an elastic synthetic material, such as bike air tube rubber, having a thickness of at least 0.5 millimeters. The other pieces of the valve are made of rigid plastic material, for example.

In theory, a single escape orifice could be provided, though from the practical point of view, especially for having good seating or adherence of the diaphragm on the discharge body and, for having optimal discharge, a plurality of escape orifices are provided.

The depressurization orifice 7 of the pressurization chamber 5, instead of cooperating with a pipe $7_2$ and a drain cock $7_1$ with mechanical opening, can cooperate with a mini electrovalve (not shown) cooperating with said depressurization orifice 7.

Similarly, a mini electrovalve cooperating with the pressurising orifice 6 can be placed at the site of the non-return valve $6_1$ cooperating with the pressurising orifice 6.

This type of mini electrovalve, familiar to those skilled in the art, has the advantage of using electric power only for their change of state between an open position allowing circulation of air across the electrovalve and a closed position preventing circulation of air towards said mini electrovalve and therefore across said orifice in question.

These mini electrovalves are stable and require no power to be kept in an open state or closed state.

As a consequence, only the change of said open state (FIG. 2A) and said closed state (FIG. 2B) requires electric power, compared to conventional electrovalves which require an external electric power supply to be kept in a given open or closed state.

A pneumatic valve with power reserve according to the present disclosure can also be used by way of supply valve $13_1$ or discharge valve $13_2$, in the air supply/discharge distribution block manifold 14 of the different compartments 11 of the mattress, such as shown in FIG. 1.

In this case, valves comprising a single admission orifice 2 and a single discharge orifice 3 could be used.

For the admission valves $13_1$ with pneumatic control and power reserve, the admission orifice 2 will be in communication with the main supply compressor $C_1$ while the discharge orifice will terminate in the pipes $t_1$, $t_2$ or $t_3$ respectively for each of the valves feeding zones of compartments $Z_1$, $Z_2$ and $Z_3$ which can be inflated at different pressures.

Symmetrically, the discharge valves $13_2$, $V_4$, $V_5$ and $V_6$ can also be constituted by pneumatic control valves 1 according to this disclosure, comprising a single discharge orifice 3 terminating in open air on the side of the manifold block $M_2$ and a single admission orifice 2 terminating in said discharge pipes $t_4$, $t_5$ and $t_6$ respectively for each of the valves $V_4$, $V_5$ and $V_6$ receiving air from the compartments of zones $Z_1$, $Z_2$ and $Z_3$.

The pneumatic control valves $13_1$ in said open state will permit inflation of said compartments 11 by injecting air originating from the compressor $C_1$.

When inflation of the compartments 11 is ceased, injection of air into said admission orifice 2 is also stopped. The diaphragm 4 deforms and is held against said admission orifice 2 and discharge orifice 3, by the fact that the internal pressure inside the pressurization chamber 5 is kept above the pressure applied to the face opposite the diaphragm, specifically the internal pressure of said compartments 11, which communicate with the hollow body 1b by means of the discharge orifices 3. The pneumatic control valve $13_1$ is thus in said closed state.

Inversely, said pneumatic discharge control valves $V_4$ to $V_6$ are in said closed state when their pressurization chamber is at a pressure greater than the internal pressure of the compartments 11 which communicates with said admission orifices 2.

When is said opening/closing means $7_1$ inside said depressurization orifice 7 are opened, the return of the diaphragm 4 to a rest position is triggered according to FIG. 2A, which empties air from the compartments connected to said pneumatic control discharge valves $V_4$ to $V_6$.

The pneumatic control valves and power reserve 1 according to the present disclosure, such as described hereinabove, require power only for pressurising said pressurization chamber 5 for a brief instant.

Since this chamber 5 is only 5 cm³, a mini compressor $6_2$ of 1.4 W of power and a rate of 300 cm³/minute functioning for less than a second and sufficient for bearing the pressure inside the chamber at a value of 500 mbar.

Some additional features of this pneumatic control valve are:

obtaining a very rapid discharge time of the air from the compartments 11, to the extent where it is possible to match the diameter of the sections of said admission orifices and discharge orifices with the diameters of the discharge pipes $t_4$ to $t_6$;

employing a single valve of CPR type in place of a CPR valve for each compartment zone Z1, Z3, representing a reduction in cost, bulk, weight and operating noise;

the operating incidence of a pneumatic control valve according to the disclosure comprises less nuisance than electromagnetic valves (electrovalves) which change state, causing a clanking noise as they change state, open state and closed state;

finally, a pneumatic control valve according to this disclosure can also provide a suppression valve in the event where the pressure of a compartment would be at the limit of the pressure/destruction of the compartment, following technical breakdown.

FIGS. 7A to 7C and 8A-8B schematically illustrate the position of the different elements of a valve according to this disclosure in its different states.

Figure 7A:
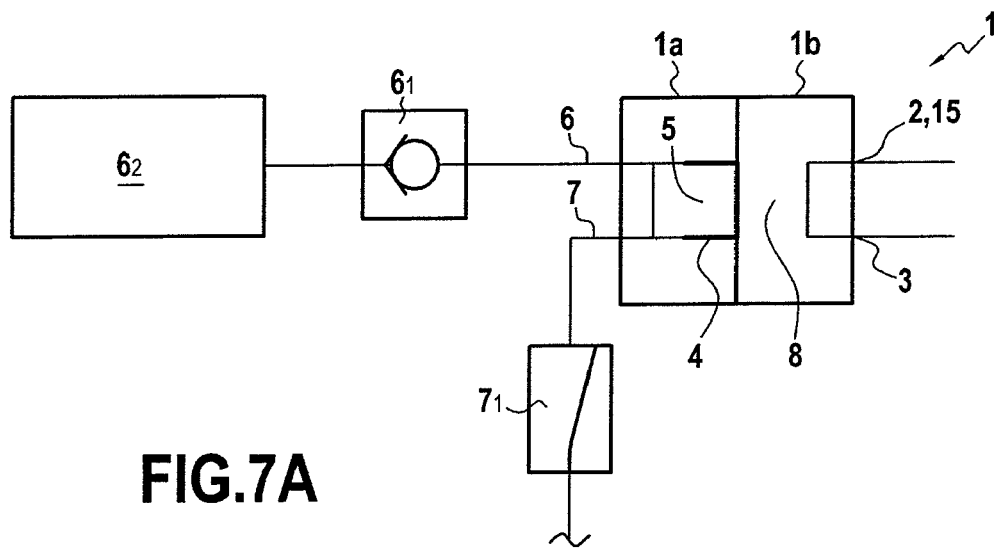
FIGS. 7A, 7B and 7C are schematic illustrations of a valve of "CPR" type prior to service (FIG. 7A), during pressurization of the pressurization chamber and deformation of said diaphragm (7B), for the purpose of deformation of said diaphragm in said closed state (FIG. 7C), by triggering a change of state (FIG. 8A) and in said open state (FIG. 8B).

In FIG. 7A, the CPR valve is represented prior to activation: the non-return valve $6_1$ is in a closed position, the diaphragm 5 is in a rest position and the emptying valve $7_1$ is in a closed position.

Figure 7B:
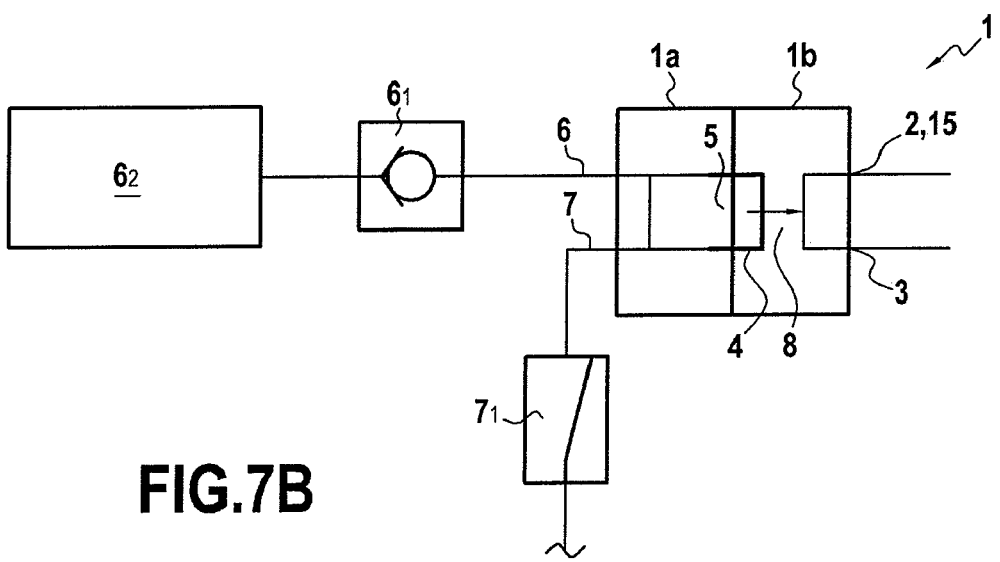

In FIG. 7B, the activation of the CPR valve is triggered by starting the mini compressor $6_2$ the effect of which is to open the non-return valve $6_1$ allowing air supply and pressurization of said pressurization chamber 5.

Figure 7C:
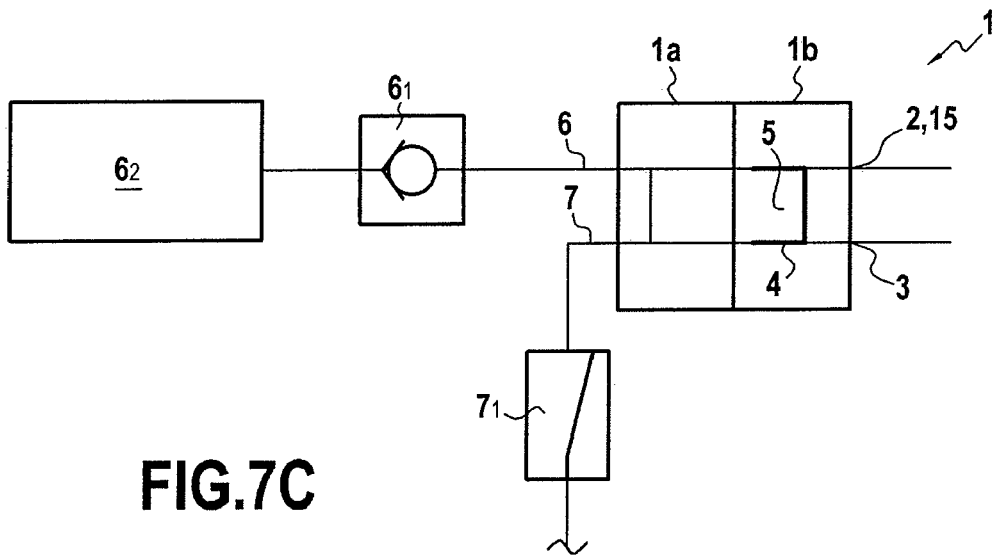

Since the emptying drain $7_1$ is closed, the pressure inside the chamber 5 grows, resulting in deforming in the direction of said admission orifices 2 and discharge orifices 3 up to a closed state shown in FIG. 7C, from which the mini compressor $6_2$ is stopped and the non-return valve $6_1$ closes the pressurising orifice 6, allowing inflation or deflation of the compartments 11 of the mattress normally, by means of the supply valves $13_1$ and discharge valves $13_2$.

Figure 8A:
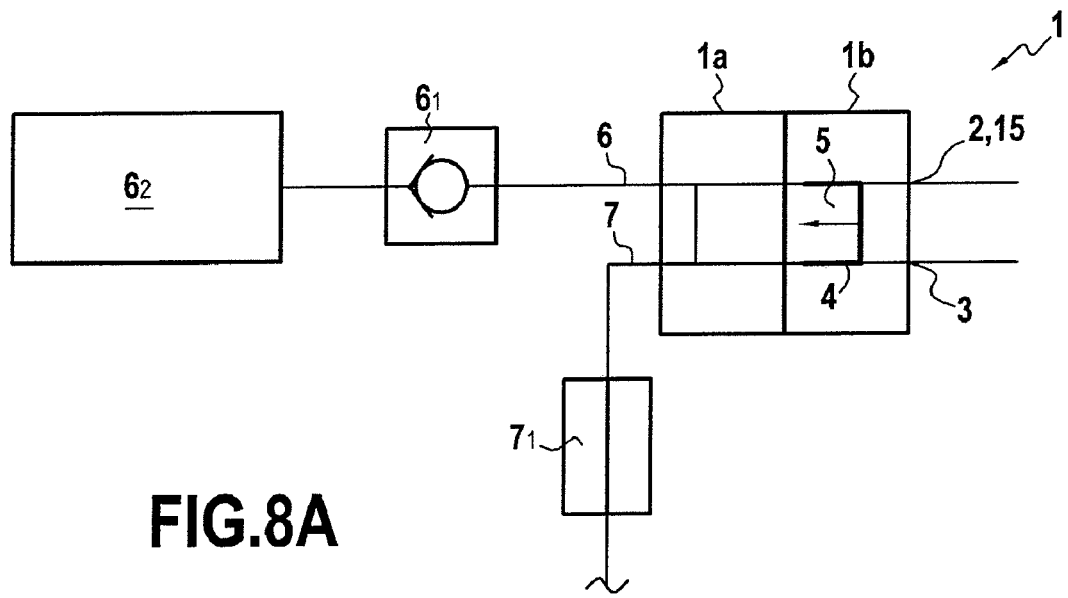
Figure 8B:
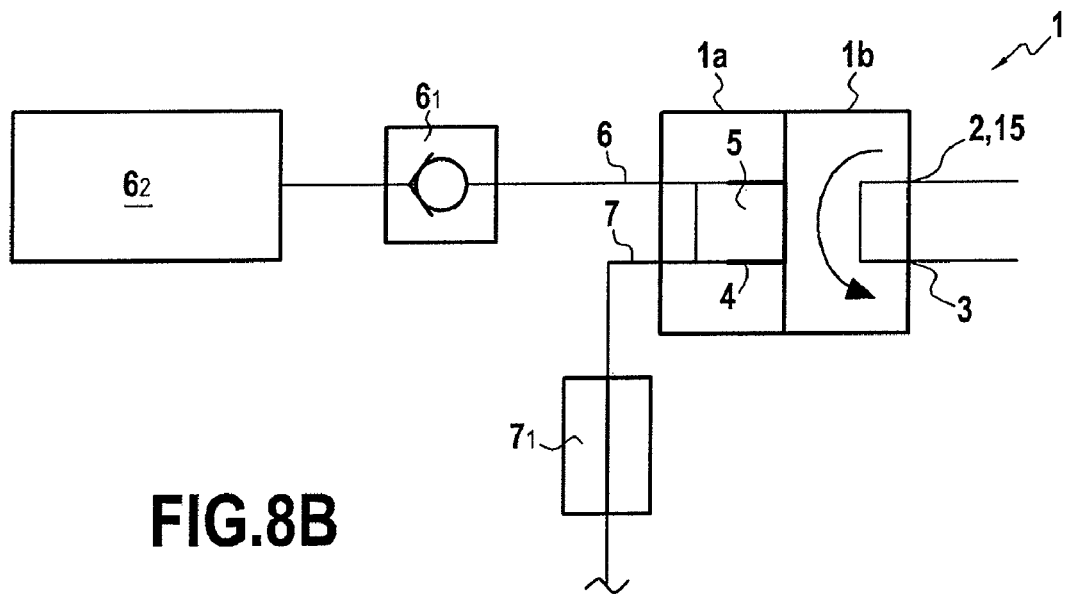

In FIG. 8A, the opening of the emptying tap 71 is triggered, allowing pressure in the pressurization chamber 5 and having the diaphragm 4 drawn back until it resumes its so-called rest position, as shown in FIG. 8B, the air then able to circulate, allowing complete emptying of the compartments 11 of the mattress via the pipes t4-t6 and 15, then the valve 1.

The invention claimed is:

1. An apparatus for use in deflating pressurized air chambers of an air mattress, the apparatus comprising
   a first valve having a pressurization chamber and a diaphragm that flexes between a first position allowing the pressurized air chambers of the mattress to vent to atmosphere and a second position blocking pneumatic communication between the pressurized air chambers of the air mattress and atmosphere,
   a non-return valve coupled pneumatically to the first valve and configured to permit pressurized air to enter the pressurization chamber and prevent backflow of pressurized air out of the pressurization chamber,
   a compressor operable to pressurize the pressurization chamber of the first valve through the non-return valve to flex the diaphragm from the first position to the second position, and
   a drain cock coupled to the pressurization chamber and movable between an opened position in which the pressurization chamber is pneumatically coupled to atmosphere and a closed position in which pneumatic communication between the pressurization chamber and atmosphere is blocked,
   wherein, when the drain cock is in the closed position and the compressor is operated, the pressurization chamber is pressurizable by the compressor to cause the diaphragm to flex from the first position to the second position,
   wherein, when the compressor is no longer operating and the drain cock is in the closed position, pressure within the pressurization chamber is maintained due to the non-return valve and the drain cock preventing escape of pressurized air from the pressurization chamber,
   wherein, after the pressurization chamber has been pressurized and the compressor is no longer operating, the drain cock is movable from the closed position to the opened position to allow the pressurized air to escape to from the pressurization chamber thereby allowing the diaphragm to flex from the second position to the first position thereby allowing the pressurized air chambers of the mattress to vent to atmosphere.

2. The apparatus of claim 1, wherein the first valve comprises a first body and a second body, the diaphragm being located between the first and second bodies.

3. The apparatus of claim 2, wherein the first body is shaped to include the pressurization chamber, the second body being provided with a diaphragm seating surface having a set of first apertures and at least one second aperture, each first aperture of the set of first apertures being pneumatically coupled to a respective one of the pressurized air chambers of the air mattress, and the at least one second aperture being pneumatically coupled to the atmosphere.

4. The apparatus of claim 3, wherein the diaphragm is spaced from the diaphragm seating surface when the diaphragm is in the first position and wherein the diaphragm deflects to seat against the diaphragm seating surface to cover the set of first apertures and the at least one second aperture when the diaphragm is in the second position.

5. The apparatus of claim 3, wherein the diaphragm seating surface comprises a concave surface.

6. The apparatus of claim 5, wherein the concave surface is shaped as a portion of a sphere.

7. The apparatus of claim 3, wherein the at least one second aperture comprises multiple second apertures.

8. The apparatus of claim 6, wherein the first apertures and the second apertures are circumferentially spaced in an alternating pattern.

9. The apparatus of claim 3, wherein the first apertures are each substantially circular in cross section and wherein the second apertures are each non-circular in cross section.

10. The apparatus of claim 2, wherein the first and second bodies are separate pieces that are fastened together.

11. The apparatus of claim 2, wherein the diaphragm has a peripheral edge that is sandwiched between the first and second bodies.

12. The apparatus of claim 2, wherein the pressurization chamber comprises a cylindrical chamber formed in the first body.

13. The apparatus of claim 1, wherein the non-return valve comprises a cylindrical body, a piston, and a spring to bias the piston toward a closed position.

14. The apparatus of claim 13, wherein the non-return valve further comprises an O-ring against which the piston is biased by the spring when the piston is in the closed position.

15. The apparatus of claim 13, wherein the cylindrical body has longitudinal grooves on its internal surface that permit air to move past the piston when the piston is moved away from the closed position against the bias of the spring.

16. An apparatus for use in deflating pressurized air chambers of an air mattress, the apparatus comprising a first valve having a pressurization chamber and a diaphragm that flexes between a first position allowing the pressurized air chambers of the mattress to vent to atmosphere and a second position blocking pneumatic communication between the pressurized air chambers of the air mattress and atmosphere, a non-return valve coupled pneumatically to the first valve and configured to permit pressurized air to enter the pressurization chamber and prevent backflow of pressurized air out of the pressurization chamber, a compressor operable to pressurize the pressurization chamber of the first valve through the non-return valve to flex the diaphragm from the first position to the second position, and means for opening and closing the pressurization chamber, the opening and closing means being coupled pneumatically to the pressurization chamber and movable between an opened position in which the pressurization chamber is pneumatically coupled to atmosphere and a closed position in which pneumatic communication between the pressurization chamber and atmosphere is blocked, wherein, when the means for opening and closing is in the closed position and the compressor is operated, the pressurization chamber is pressurizable by the compressor to cause the diaphragm to flex from the first position to the second position, wherein, when the compressor is no longer operating and the means for opening and closing is in the closed position, pressure within the pressurization chamber is maintained due to the non-return valve and the means for opening and closing preventing escape of pressurized air from the pressurization chamber, wherein, after the pressurization chamber has been pressurized and the compressor is no longer operating, the means for opening and closing is movable from the closed position to the opened position to allow the pressurized air to escape to from the pressurization chamber thereby allowing the diaphragm to move from the second position to the first position thereby allowing the pressurized air chambers of the mattress to vent to atmosphere.

17. The apparatus of claim 16, wherein the means for opening and closing comprises an electrovalve that is activated electrically.

18. The apparatus of claim 17, wherein the first valve comprises a first body and a second body, the diaphragm being located between the first and second bodies, the first body is shaped to include the pressurization chamber, the second body being provided with a diaphragm seating surface having a set of first apertures and at least one second aperture, each first aperture of the set of first apertures being pneumatically coupled to a respective one of the pressurized air chambers of the air mattress, and the at least one second aperture being pneumatically coupled to the atmosphere.

19. The apparatus of claim 18, wherein the first apertures and the second apertures are circumferentially spaced in an alternating pattern, the first apertures are each substantially circular in cross section, and the second apertures are each non-circular in cross section.

20. The apparatus of claim 18, wherein the pressurization chamber comprises a cylindrical chamber formed in the first body and the diaphragm seating surface comprises a concave surface formed in the second body.

* * * * *